United States Patent [19]

Skipper

[11] Patent Number: 4,788,089
[45] Date of Patent: Nov. 29, 1988

[54] HEAT-RECOVERABLE ARTICLE

[75] Inventor: Richard S. Skipper, Preston, England

[73] Assignee: Raychem Limited, London, England

[21] Appl. No.: 836,359

[22] Filed: Mar. 5, 1986

[30] Foreign Application Priority Data

Mar. 6, 1985 [GB] United Kingdom ............... 8505785

[51] Int. Cl.⁴ ............................................. F16L 11/16
[52] U.S. Cl. ............................. 428/34.9; 138/129; 138/154; 174/DIG. 8; 428/222; 428/35.1
[58] Field of Search .............. 174/DIG. 8; 428/36, 428/222; 138/129, 154

[56] References Cited

U.S. PATENT DOCUMENTS

| | | | |
|---|---|---|---|
| 3,379,218 | 7/1965 | Conde | 138/99 |
| 3,491,799 | 1/1970 | Foll | 138/129 |
| 4,234,758 | 11/1980 | Guzy | 174/DIG. 8 |
| 4,239,064 | 12/1980 | Gilman | 138/129 |
| 4,428,790 | 1/1984 | Diaz | 174/DIG. 8 |
| 4,441,017 | 3/1984 | Sorlien | 174/DIG. 8 |
| 4,450,871 | 5/1984 | Sato et al. | 174/DIG. 8 |
| 4,486,484 | 12/1984 | Schafer | 138/129 |
| 4,497,760 | 2/1985 | Sorlien | 156/86 |
| 4,523,970 | 6/1985 | Toy | 156/244.1 |

FOREIGN PATENT DOCUMENTS

| | | |
|---|---|---|
| 1155470 | 11/1966 | United Kingdom . |
| 1211988 | 5/1969 | United Kingdom . |
| 1346479 | 8/1970 | United Kingdom . |
| 1392212 | 4/1971 | United Kingdom . |
| 1532905 | 6/1976 | United Kingdom . |

Primary Examiner—John E. Kittle
Assistant Examiner—James J. Seidleck
Attorney, Agent, or Firm—Edith A. Rice; Herbert G. Burkard

[57] ABSTRACT

Self-supporting helical heat-recoverable material provides easily installed insulating covering for wires and cables. The helical arrangement may be made by differential recovery of a two-layered tape of the heat-recoverable material around a cooled mandrel such that the inner tape layer recovers more than the outer. The inner layer may also serve as an adhesive layer or may carry an adhesive coating.

9 Claims, 6 Drawing Sheets

HEAT-RECOVERABLE ARTICLE

This invention relates to a protective wrap-around article of heat-recoverable material.

Heat-recoverable wrap-around articles are widely used in many areas, especially where insulating, sealing or otherwise protecting a substrate is required. A wrap-around article, as opposed to a preformed tubular article, is especially useful when the end of an elongate substrate is not easily accessible.

One known method for protecting a substrate is to use heat-recoverable tape such as that described in U.K. Pat. No. 1 532 905. This commonly comprises cross-linked polymeric material, and is wrapped, in its expanded form, spirally around a substrate and then heated so that the tape recovers and seals onto the substrate. One disadvantage of such a tape is that the windings tend to crease and fold as they overlap each other due to the difficulty of winding a straight tape spirally around a substrate, and hence an undesirable poor seal may be formed under the overlaps of the windings.

An improved wrap-around article is a heat-recoverable wrap-around sleeve, of which many forms are known. Basically these are heat-recoverable polymeric sheets which can be wrapped around the substrate to form a generally tubular shape and which, in general, are provided with a fastening means for holding them in the wrapped-in configuration during recovery. Such fastening means are usually mechanical and comprise, for example, rigid clamps, pins or channel members which co-operate with suitably shaped moulded or extruded protuberances adjacent to the abutting edges of the heat-recoverable sheet. Various types of fastening means are known, for example those described in U.K. Pat. Nos. 1 155 470, 1 211 988 and 1 346 479, and in U.S. Pat. No. 3,379,218. For example, the sleeve of Pat. No. 1 155 470 comprises a wrap-around sleeve and a channel that slides over the raised edges, "rails", of the sleeve when it is wrapped around a substrate. Such a closure device requires access at one end of the sleeve so that the channel can be aligned for sliding over the rails.

Non-mechanical means are also known, such as the closure described in U.K. Pat. No. 1 392 212, which comprises a complex wrap-around polymeric sleeve with a heat-curable laminate on the edges of the sleeve, such that, on wrapping around a substrate and heating, the edges overlap and involutely curl to form a self-sealing covering. However, such non-mechanical means are often difficult to apply in practice and tend to give an inefficient seal since the forces of recovery oppose the forming of the closure.

The present invention provides an article comprising a strip of heat-recoverable polymeric material pre-formed into a self-supporting helical configuration capable of being wrapped around a substrate.

The pre-formed helical configuration has the advantage that the article so formed, unlike known tapes, is self-locating and the windings tend not to crease or fold, hence giving a good seal and minimising any manual error in wrapping the strip around a substrate. Further, the article of the invention comprises only one component, compared with two or more components in known mechanical closures, such as mentioned above, and can be used in a restricted area where only the part of the substrate that is to be enclosed by the wrap-around article is accessible.

A preferred form of the invention provides a strip pre-formed into a helical configuration having overlapping windings. The overlaps lessen the possibility of any leak paths occurring between the windings of the strip, and therefore improve the seal formed. Due to the helical nature of the article each overlapping winding fits neatly over the previous winding and the strip can be formed with a stepped configuration, as viewed in cross-section looking along the longitudinal axis of the strip, such that the overlap of each succesive winding fits into the step of the previous winding, giving a smoother surface to the article after recovery.

This overlapping configuration also has the advantage that the force of recovery in shrinking the wrapping around a substrate also reinforces the sealing of the windings to one another, in contrast with known forms of wrap-around article using edge-to-edge closures, in which the forces of recovery oppose the forming of a reliable seal.

The strip according to the present invention may be heat-curlable such that, in addition to recovering longitudinally, it curls inwardly about the helical axis.

A strip is said to be heat-curlable if it has been formed such that on heating it will curl about a given axis or axes. To achieve this the strip preferably comprises at least an inner and an outer layer, the inner layer being recoverable at a lower temperature than the outer layer, or at the same or lower temperature and to a greater extent than the outer layer, so that on heating the inner layer will start to recover before, and/or to a greater extent than, the outer layer.

The two layers that comprise the strip may be formed by differential treatment of a single polymeric body, for example by cross-linking one half of the depth of the strip to a greater extent that the other half; or by lamination of two initially separate polymeric bodies, one of which may be stretched to a greater extent that the other. For either of these forms the two layers may comprise the same polymer, or the inner layer may comprise a different polymer from the outer layer.

If the strip is formed by lamination of two separate polymeric bodies, then this may be done directly, for example by co-extrusion of the two polymeric bodies, or it may be done indirectly, for example by applying an additional layer between the two polymeric bodies, such as a peroxide layer or a polymer film impregnated with a peroxide.

The preferred thickness of the helical strip depends upon the application. However, the thickness of the layers that comprise the strip, and especially the inner layer, must be such that the layers remain integral on stretching and do not fibrilate or otherwise become discontinuous. In general, a final thickness of the stretched, but unrecovered, helical strip of 0.5–3.0 mm has been found suitable, more preferably 0.8–2.0 mm, and especially 1.0–1.5 mm. The thickness ratio of the two layers that comprise the strip can of course be varied. However, the inner layer preferably will not exceed 80% of the strip thickness, and is more preferably less than 50%, and especially between 30–40%.

Another aspect of the present invention is the provision of an adhesive or sealant as the innermost layer of the article. The adhesive or sealant may be a separate layer in addition to the said inner and outer layers or it may be the said inner layer itself. The adhesive is preferably a hot-melt adhesive which will melt during heat-recovery and adhere to the substrate, although other types of adhesives and sealants are not excluded. Where the inner layer is also an adhesive the degree of cross-linking of this layer is important. Too high a cross-link, density would give a layer capable of heat-recovery, but unable to flow and adhere to the substrate; whereas too low a cross-link density would give a layer with good adhering properties but poor heat-recoverability. Therefore in such a case, the electron beam dose applied to the inner layer is preferably less than 12 Mrads, more preferably 2–6 Mrads and especially 4 Mrads.

The invention includes a method of producing an article which involves forming a strip of polymeric material having at least a first and second layer, at least the first layer, preferably both, being dimensionally recoverable and the first layer preferably being recoverable independently of, or to a greater extent than, the second layer. A differential rate of heat-recoverability may be obtained for example, by stretching the first layer to a greater extent than the second layer or by equally stretching and then cross-linking the first layer to a lesser extent than the second layer. This differential cross-linking can be achieved for example, by applying a lower electron beam dose to the first layer and a higher electron beam dose to the second layer, or by choosing a polymer for the first layer which is inherently less cross-linkable than the polymer chosen for the second layer, or by adding a cross-linking agent such as a free radical initiator to the second layer and/or adding a cross-linking inihibitor to the first layer before cross-linking the layers. Examples of free radical initiators include peroxides such as dicumyl peroxide, 2,5-bis-(t-butyl-peroxy)-2,5-di-methylhexane, 2,5-bis(t-butyl-peroxy)-2,5-dimethyl-hexyne-3, and alpha, alpha'-bis(t-butyl-peroxy)-di-isopropyl-benzene. Other examples of appropriate cross-linking agents are disclosed in C. S. Sheppard & V. R. Kamath Polymer Engineering & Science 19 No. 9 597–606 1979 "The Selection and Use of Free Radical Initiators". The cross-linking agent may be employed alone or in association with a co-curing agent such as a poly-functional vinyl or allyl compound, for example triallyl cyanurate, triallyl isocyanurate, pentaery-thritoltetra-methacrylate, methylene bis-acrylamide or $NN^1$-m-phenylene-di-malemide. Examples of cross-linking inhibitors include thermal anti-oxidants such as 4,4'-thiobis-(6-tertiary-butyl-m-cresol); 4,4'-methylene-bis-(2-tertiary-butylphenol); 2,6-ditertiary-butyl-phenol; 4,4'-butylidenebis-(6-tertiary-butyl-m-cresol); 2,5-di-(tertiary-amyl)-hydroquinone. Examples of cross-linking inhibitors which are not anti-oxidants are pentabromophenol, naphthylene and copper stearate.

Methods of rendering the first layer independently recoverable before the second include using a polymeric material for the first layer that recovers at a lower temperature than the polymeric material of the second layer; or to use solvent recovery of the first layer.

The strip is then formed into a helical configuration preferably by heating the first layer to cause curling and then winding the strip helically around a cool mandrel with the first layer forming the inner layer, in a preferably continuous process. The temperature of the mandrel depends on the material used, but in general it must lie within a range such that the temperature is not so cold that the strip will fracture as it is wound around the mandrel, but it is not so hot that the outer layer also begins to recover or that the strip melts and adheres to the mandrel. Each portion of the first layer is recovered, for example using heat, before it is wound around the mandrel so that it will at least partially recover, but will not adhere to the mandrel or to the previous winding and will not unacceptably affect the recovery of the outer layer. The recovery temperature depends on the materials used and would be easily determined by one skilled in the relevant art. The resulting article is then removed from the mandrel.

If an adhesive or sealant is to be used and this is to be an additional coating over the inner layer of the article, then this is preferably applied as the strip is removed from the mandrel, or the strip can be removed from the mandrel first and then the adhesive or sealant applied.

Before the wrap-around article of the present invention can be applied to a substrate it must first be "reverse wound", i.e. the overlap that is outmost after producing the article must be the innermost overlap before application. This arrangement allows the strip to form its helical configuration as it is wrapped around the substrate in use. The reverse winding can be done after the article is removed from the mandrel at the end of the production process, or it can be done directly before applying the article to the substrate.

On application of the helical strip to a substrate, heat is preferably applied to the outermost winding first, working progressively along the strip so that the innermost winding is the last to recover. During recovery the edge of the outermost winding may be held to the substrate using, for example, an adhesive tape which may then be removed after the strip has shrunk around the substrate.

The heat-recoverable materials used in producing the strip may be any of the polymers known to be useful for the production of heat-recoverable articles. Among suitable polymers there may be mentioned, for example, polyolefin, especially polyethylene, copolymers of ethylene and vinyl acetate, copolymers of ethylene and ethyl acrylate, chlorinated and fluorinated polymers, especially polyvinyl chloride, polyvinylidene fluoride and polymers incorporating units from vinylidene fluoride, hexafluoroethylene and chlorotrifluoroethylene; and rubbers such as ethylene/propylene rubber, chlorinated rubbers, e.g. Neoprene, and silicone rubbers which may be used in a blend with a crystalline or glassy polymer such as an olefin polymer.

As mentioned above the internal surface of the strip will, in general, be an adhesive or a sealant such as a hot-melt adhesive or a mastic. When this adhesive or sealant is a coating over the aforesaid inner layer of the article then suitable hot-melt adhesives include, for example, polyamides, ethylene/vinyl acetate copolymers and terpolymers (with or without incorporated waxes) and polyesters. Such materials are described, for example, in U.K. Pat. No. 1 440 810, U.S. Pat. No. 4,018,733 and German OS No. 2 709 717. Also suitable are curable adhesives which first melt and flow then cure on heating and which will not afterwards be heat-meltable such as epoxy resins. There may also be mentioned epoxy resins and conventional mastics such as, for example, those based on butyl and isobutylene rubbers modified with suitable materials as known per se. If the aforesaid inner layer of the article is also the adhesive or sealant layer, then it is important that the adhesive or sealant chosen is crystalline to an extent such that it can be expanded and then recovered upon the application of heat or other methods of recovery used. A suitable heat-recoverable, hot-melt adhesive, for example, is an ethylene/vinyl acetate copolymer containing preferably up to 25 weight per cent vinyl acetate. Obviously the use or otherwise of adhesive materials, and their type and application will depend upon the particular requirements in each particular case.

Specific embodiments of the present invention will now be described, by way of example only, with reference to the accompanying drawings in which.

Figure 6A:
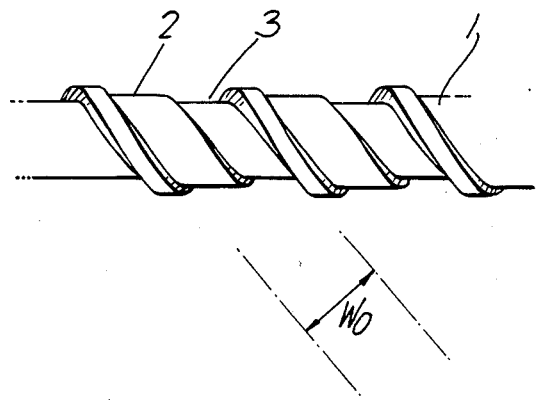
Figure 6B:
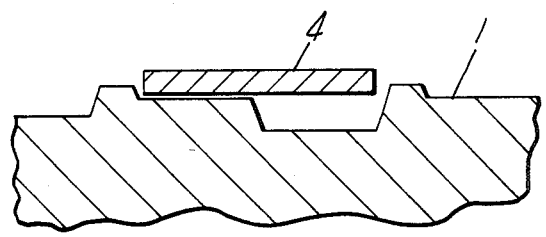
Figure 6C:
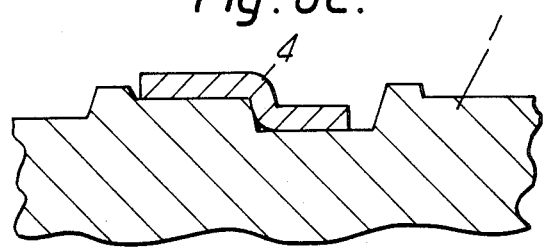

FIGS. 6A–C allow a method of making helically shaped heat shrinkable tape of the present invention in a specific length.

Figure 7A:
Figure 7B:
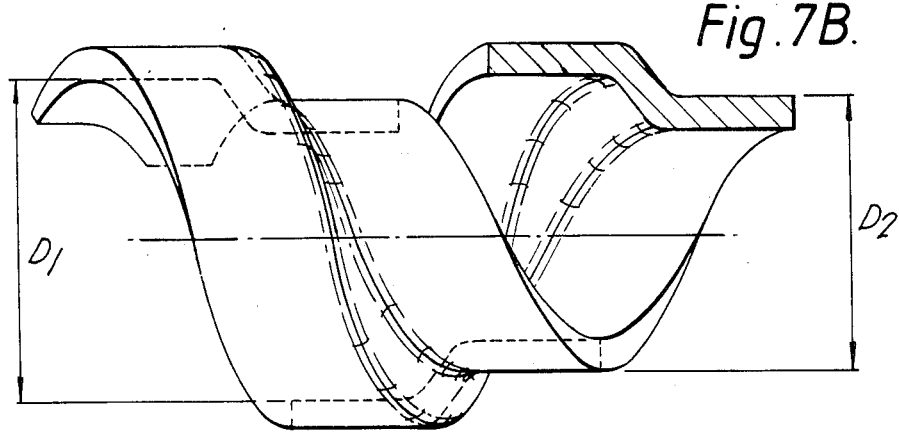

FIGS. 7A and 7B show the helically shaped heat shrinkable tape of FIG. 6 after fabrication.

Figure 8A:
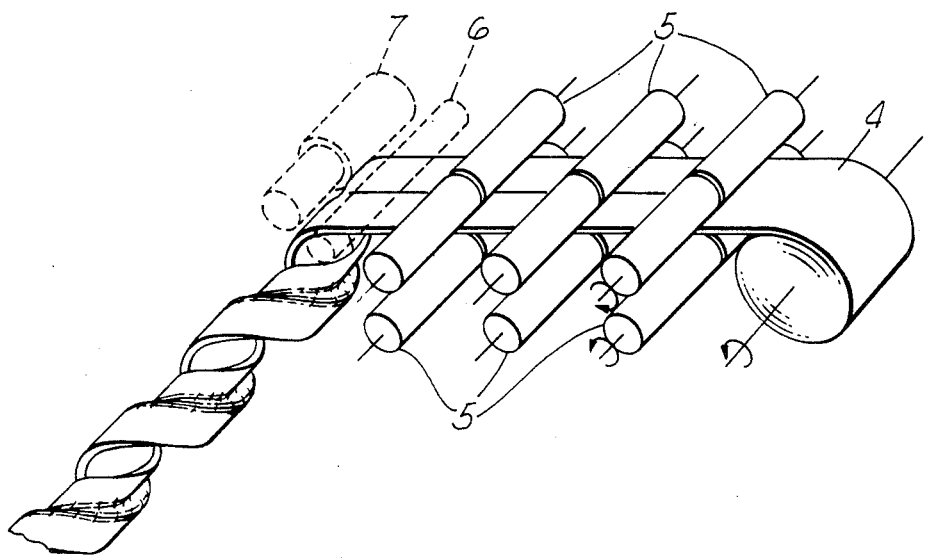
Figure 8B:
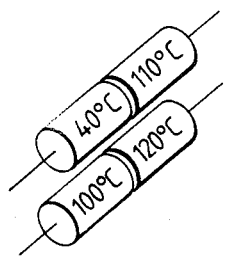

FIGS. 8A and 8B show a method of meaking helically shaped heat shrinkable tape of the present invention in continuous lengths.

Figure 9A:
Figure 9B:
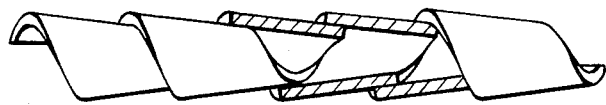
Figure 9C:
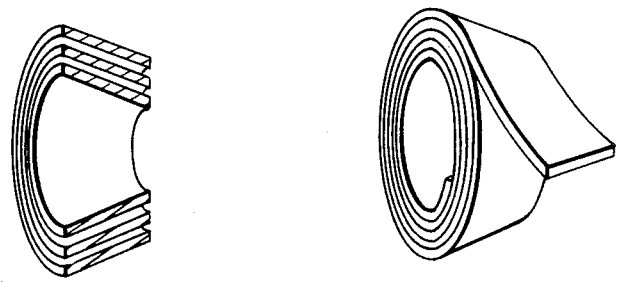

FIGS. 9A–9C show a helically shaped heat shrinkable tape of the present invention having its spirals in an unstepped form.

Figure 10A:
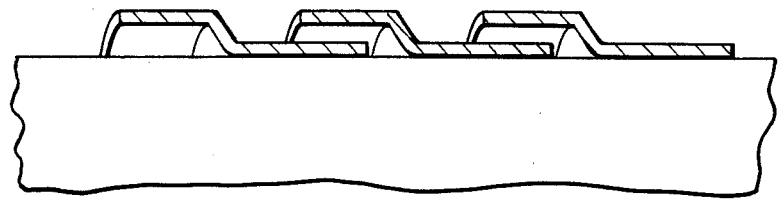
Figure 10B:
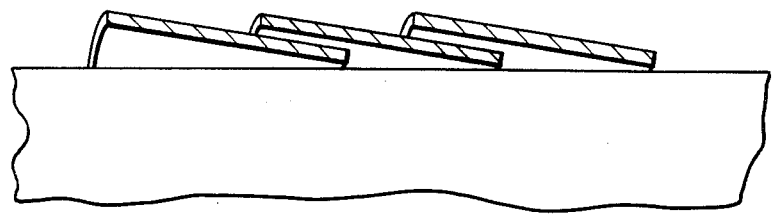
Figure 10C:
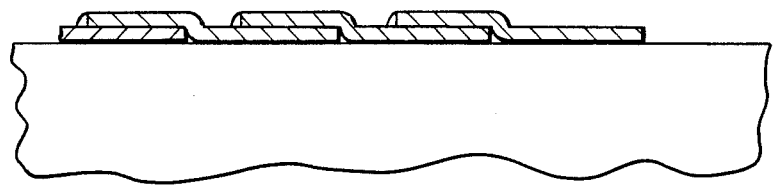

FIGS. 10A–10C show cross-sections of helically shaped heat shrinkable tape of the present invention when wrapped and after completion of heat shrinking.

Figure 1:
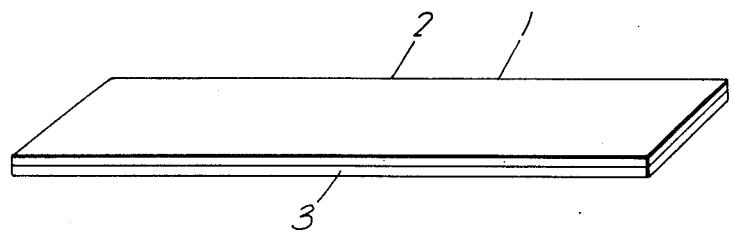
FIG. 1 is a two layer laminate.

Referring to the drawings, FIG. 1 shows a strip 1 comprising two layers 2 and 3. Both layers are made of a heat-recoverable polymeric material with layer 2 being dimensionally recoverable at a lower temperature, or at the same or lower temperature and to a greater extent than layer 3.

Figure 2:
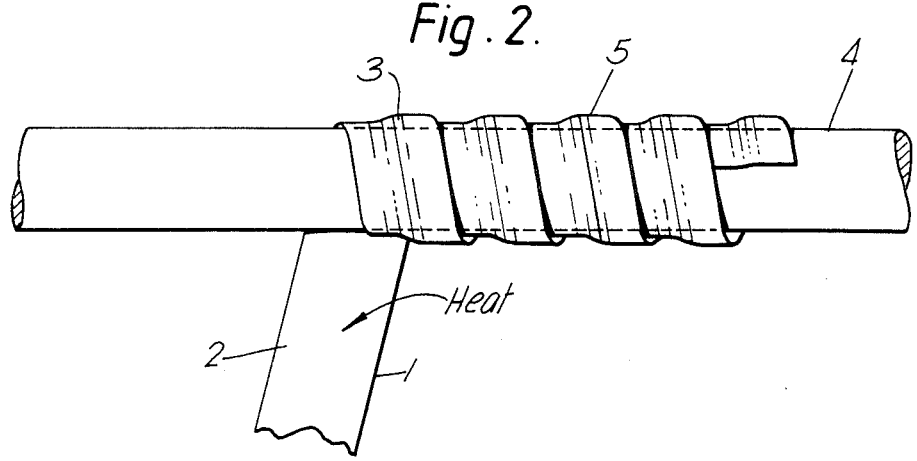
FIG. 2 is a perspective view of the laminate being wrapped around a mandrel.

FIG. 2 illustrates a method of forming the strip into a helical configuration. The strip 1 is wrapped around a mandrel 4 with each consecutive winding partially overlapping the previous winding forming the heat-recoverable article 5. Layer 2 forms the inner layer nearest to the mandrel and layer 3 the outer layer. Before the strip is wound around the mandrel, layer 2 is at least partially heat-recovered so that the strip curls inwardly about the mandrel, but will not adhere to the mandrel or the previous winding. The resulting helical shaped article is removed from the mandrel and reverse wound, to form the self-supporting, heat-recoverable article shown in FIG. 3.

Figure 4:
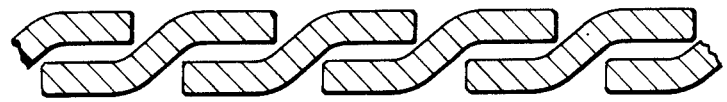
FIG. 4 is a longitudinal cross-section of a portion of the article and shows the stepped formation of the overlaps of the strip.

FIG. 4 illustrates a preferable form of the overlaps of the strip in cross-section. A "step" has been formed in each overlap so that each winding fits neatly over the previous winding.

Figure 3:
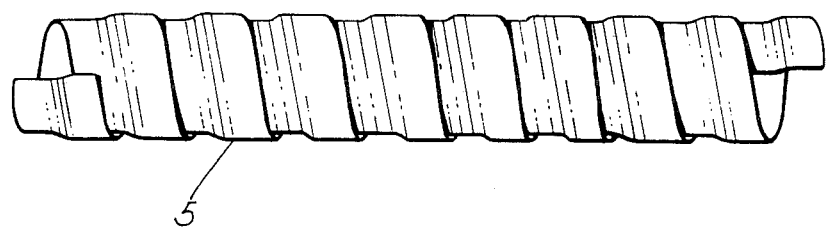
FIG. 3 is a perspective view of the article after the final stage of manufacture.
Figure 5:
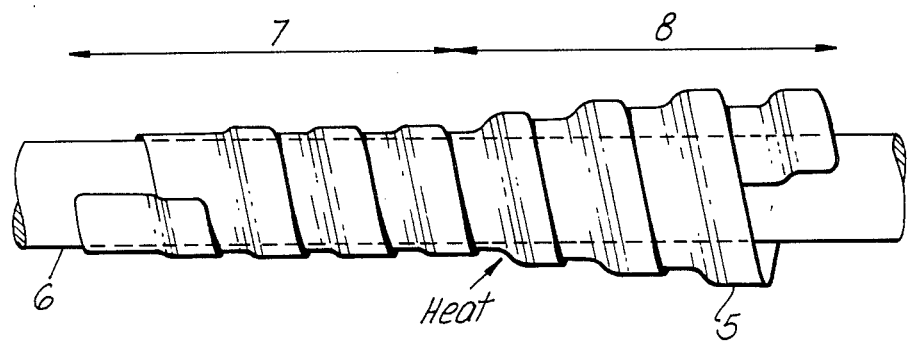
FIG. 5 is a perspective view of the article during application and heat recovery of the strip onto a substrate.

FIG. 5 illustrates the application of the article of FIG. 3 to a substrate 6. After wrapping the article around the substrate, heat is applied to the outer layer 3 of each succesive winding, beginning with the outermost winding. In FIG. 5 a portion 7 of the strip has been recovered and heat is being applied to the next winding of the unrecovered portion 8.

Specific examples of the formation of articles acording to the invention as illustrated by the drawings now follow.

EXAMPLE 1

A strip was formed by taking a layer of low density polyethylene (LDPE) and longitudinally 'cold-stretching' it, that is stretching below the crystalline melting point of the polymer, to twice its original length. A layer of unstretched high density polyethylene (HDPE) was extruded onto the LDPE layer and the resulting laminated strip was itself cold-stretched to three times the original length of the laminate. The strip was then cross-linked by applying an electron beam dose of 6 Mrads.

The strip was wound helically around a mandrel cooled to $-5°$ C., as shown in FIG. 2 of the drawings, the LDPE forming the inner layer. During winding, the portion of LDPE that was about to form the next winding was progressively heated so that it recovered and curled inwardly around the mandrel but without adhering to the mandrel or to the previous winding, and without significantly affecting the recovery of the outer HDPE layer. This curling of the LDPE layer around the mandrel gives the strip its self-supporting helical configuration. The article was then removed from the mandrel, and a coating of hot-melt adhesive applied to the surface of the LDPE layer.

EXAMPLE 2

A strip was formed by taking a layer of ethylene/vinyl acetate (EVA) copolymer containing 18 weight % vinyl acetate, and longitudinally cold-stretching it to twice its original length. A layer of unstretched LDPE was coated onto the EVA, the resulting laminated strip cold-stretched to three times the original length of the laminate, and then cross-linked by applying an electron beam dose of 4 Mrads.

The method then follows that of Example 1 with the exception that the coating of hot-melt adhesive onto the surface of the inner layer is omitted, as the EVA acts as both a heat-recoverable material and a hot-melt adhesive.

EXAMPLE 3

This is the same as Example 2, except that after coating the LDPE onto the EVA the resulting laminate was beamed to 4 Mrads and then stretched above the crystalline melting point of the cross-linked polymers to three times the original length of the laminate.

In order to improve the surface properties of the tape such as tracking resistance, heat resistance or solvent resistance, a surface layer of polytetrafluoroethylene, polyvinylidene fluoride, tetrafluoroethylenehexafluoropropylene copolymer, etc. may be provided on one (outer) surface of the tape, and a layer of sealant or adhesive such as ethylene vinyl acetate may be provided on the other (inner) surface, but these are not essential.

EXAMPLE 4

Another exemplary method of manufacturing the helical tape of the present invention, in particular a method of manufacturing a helically shaped heat shrinkable insulation tape of a specific length, will now be described with reference to FIG. 6.

In FIG. 6 the mandrel (1) is made of metal and has staged grooves (2) (3) cut helically around the outer circumference. The width $W_o$ of the staged grooves (2) (3) is slightly wider than the width W of the tape material. The surface of the staged grooves (2) (3) is preferably covered with a fluoropolymer such as Teflon (brandname) for easier release. The mandrel (1) in FIG. 3(A) is of my desired length, e.g. 2 meters. A separately provided tape (4) of ordinary shape is wound around the staged grooves (2) (3) FIG. 6(B)) and maintained in this position for several minutes at the required temperature e.g. 120° C. until it is shrunk to a state as shown in FIG. 6(C). The long helically shaped material obtained when it is removed from the mandrel as shown in FIG. 7. FIG. 7(A) shows the helically shaped heat shrinkable insulation tape of the present invention and FIG. 7(B) shows an enlargement of a cut out section.

Tape dimensions: Thicknes 1.2 mm Width 50.8 mm (2 in.)
Mandrel dimensions
Diameter of staged groove (2) 35 mm
Diameter of staged groove (3) 25 mm
Helical pitch length 70 mm In this case, the left half of the tape in FIG. 7(B) has virtually no longitudinal shrinkage and the thickness of 1.2 mm does not change but the right half is shrunk approximately 30% in the longitudinal direction and the thickness has increased by approximately 40% to 1.7 mm.

In this way, the left half of the helical tape has a helical inside diameter $D_1 = 35$ mm while the right half has a helical outside diameter $D_2 = 25 + 1.7 \times 2 = 28.4$ mm so that it can be wrapped easily around cables, etc. In other words, wrapping is simplified by making $D_1 > D_2$.

EXAMPLE 5

Another method of manufacturing an insulation tape of the present invention, in particular a method of manufacturing helically shaped tape in continuous lengths is explained using FIG. 8.

In FIG. 8, the tape (4) is fed into an appropriate number of sets of heating rollers (5) (5) (5). Each roller (5) is thermally insulated in the middle with different temperatures on the right side and the left side. In FIG. 8, the lower rollers are maintained at a higher temperature then the upper rollers and the right side rollers are maintained at a higher temperature then the left side rollers. In this way, a difference in shrink ratio is created by the temperature gradient so that the bottom surface of the tape (4) shrinks more than the top surface and the right half shrinks more than the left half to form the helically shaped tape of the present invention.

In order to aid the formation of the helical shape and to control the finished deimensions, it is desirable to provide a cooling mandrel (6) and a cooling pressure mandrel (7).

FIG. 8(B) shows an example of the temperature settings of the rollers.

EXAMPLE 6

Examples 4 and 5 showed helically shaped tapes of the present invention having spirals molded in stepped form. The tape of the present invention can also be manufactured in an unstepped form having the helical diameter continuously decreased from one end to the other.

In Example 5, a thermal insulation barrier was provided in the middle of the roller (5) to differentiate the temperatures on the right and left sides. However, the temperature can also be changed from left to right by supplying thermal energy to the roller (5) only from the left end. By doing this, a differently shaped tape of the present invention can be obtained as shown in FIG. 9 FIG. 9(A) shows the spiral in a relatively extended form, FIG. 9(B) shows the spiral in a relatively contracted form to save space during transportation and storage. FIG. 9(C) shows further contraction for storage.

Since the helically shaped heat shrinkable insulation tape of the present invention is constructed as described above, it can be wrapped very easily around linear substrates such as conductors or pipe substrates event when the tape material is stiff and has very little elongation. By heating with a propane gas torch or other known methods, a covering in intimate contact with the linear substrate can be obtained.

FIG. 10(A) and 10(B) show cross-sections of the tape when wrapped, FIG. 10(C) shows the cross-section after heat shrinking is completed.

The helically shaped heat shrinkable insulation tape of the present invention is intended for uses such as insulation protection of aerial transmission and distribution cables, insulation protection of structural members such as steel members contiguos to the changed areas inside a substation, protection of buried transmission cables and indoor distribution cables from physical damage and fires, corrosion protection of buried pipelines, etc.

I claim:

1. An article comprising a strip of heat-recoverable polymeric material pre-formed into a self-supporting, self-locating helical configuration capable of being wrapped around a substrate, wherein the strip is pre-formed into a helical configuration having overlapping windings, each having a stepped formation such that each successive winding fits into the step of the previous winding.

2. An article according to claim 1, wherein the strip is heat-curlable such that it curls inwardly about the helical axis.

3. An article according to claim 1 which comprises at least an inner and an outer layer.

4. An article according to claim 3, wherein the inner and outer layers are cross-linked.

5. An article according claim 3 wherein at least one of the layers is heat-recoverable.

6. An article according to claim 3 wherein the inner layer is also an adhesive layer.

7. An article according to claim 6 wherein the inner layer has been subjected to an electron beam dose of less than 12 Mrads, preferably 2 to 6 Mrads.

8. An article as claimed in claim 1 which has been wrapped around and recovered onto a substrate.

9. An article according to claim 1 when held in the form of a substantially flat coil against its own internal forces urging the coil to extend towards the helical configuration.

* * * * *